United States Patent [19]

Douglas

[11] Patent Number: 5,088,134
[45] Date of Patent: Feb. 18, 1992

[54] PORTABLE NON-FLUSHING TOILET

[76] Inventor: Ian F. Douglas, 11 Hawthorn Avenue, Caulfield North, Victoria, Australia, 3162

[21] Appl. No.: 345,541

[22] PCT Filed: Oct. 16, 1987

[86] PCT No.: PCT/AU87/00348
§ 371 Date: May 9, 1989
§ 102(e) Date: May 9, 1989

[87] PCT Pub. No.: WO88/02614
PCT Pub. Date: Apr. 21, 1988

[30] Foreign Application Priority Data

Oct. 20, 1986 [AU] Australia ............... PH8582
Nov. 27, 1986 [AU] Australia ............... 9198

[51] Int. Cl.⁵ .................................. A47K 11/06
[52] U.S. Cl. ............................ 4/484; 4/459; 4/467; 4/486
[58] Field of Search ............ 4/449, 459, 464, 467, 4/468, 470, 476, 479, 483, 484, 486, 474, 452, 144.2

[56] References Cited

U.S. PATENT DOCUMENTS

| | | | |
|---|---|---|---|
| 2,801,426 | 8/1957 | La Gorde et al. | 4/484 |
| 2,912,702 | 11/1959 | Mackenzie | 4/476 |
| 2,974,321 | 3/1961 | Salka | 4/476 |
| 3,118,146 | 1/1964 | Dorey | 4/476 |
| 3,416,164 | 12/1968 | Ekrut | 4/484 |
| 3,495,278 | 2/1970 | Peters | 4/484 |
| 3,600,719 | 8/1971 | Karr | 4/476 |
| 3,602,924 | 9/1971 | Kneisley | 4/484 |
| 3,737,920 | 6/1973 | Savee | 4/484 |
| 3,801,991 | 4/1974 | Fulton et al. | 4/323 |
| 3,859,672 | 1/1975 | Modig | 4/111.1 |
| 3,943,578 | 3/1976 | Miya et al. | 4/471 |
| 4,199,826 | 4/1980 | Devereux | 4/479 |

FOREIGN PATENT DOCUMENTS

| | | |
|---|---|---|
| 1188456 | 6/1985 | Canada . |
| 1157207 | 11/1988 | Canada . |
| 3128075 | 1/1983 | Fed. Rep. of Germany . |
| 3267 | 1/1882 | United Kingdom ............... 4/486 |

Primary Examiner—Henry J. Recla
Assistant Examiner—Glenn T. Barrett
Attorney, Agent, or Firm—Mason, Fenwick & Lawrence

[57] ABSTRACT

A portable toilet device has a disposable waste receiving bag situated therein. The device is operable from an open or in-use position to a closed or non-use position which causes rotation of the waste receiving bag to temporarily close or seal the bag.

13 Claims, 4 Drawing Sheets

PORTABLE NON-FLUSHING TOILET

This invention relates to portable human waste collection devices, commonly known as portable toilets, and relates particularly but not exclusively to a non-flushing portable toilet utilising disposal bags for collection, storage and/or transport of the disposable waste.

Prior known portable toilets either operate on a flushing system requiring a water supply and include a separate waste holding tank which can be disconnected from the device for subsequent disposal of the waste or are simple devices merely having a plastics material waste bag suspended or removably attached therein. Such portable toilets are of limited use when prolonged usage is required or when no water supply is available for flushing. Such circumstances may be encountered in a natural disaster area where water supply and sewerage systems are disrupted.

Illustrative of such prior art portable toilet devices are those devices described in U.S. Pat. Nos. 3,859,672, 4,199,826, 3,801,991, Canadia Patent Nos. 1188456 and 1157207 and German Patent No. 3128075. Other prior art references of relevance are U.S. Pat. No. 2,801,426 to La Gorce and U.S. Pat. No. 3,943,578 to Miya.

The La Gorce Patent discloses a disposable bag toilet having inter alia a hinged seat and a bag having two draw strings. The bag has a normally open top. Operation of the hinged lid causes the draw strings to close the bag. Operation of the lid does not and cannot return the bag to its "normally open" or ready-for-use position.

The Miya Patent discloses a throttle valve for fitment between a toilet seat and a reservoir for excreta. The throttle valve comprises two coaxial cylindrical membranes which can be twisted to either an open or closed position.

The lower membrane is closed during the use by rotating a flange to appropriate angular position so as to temporarily hold the faeces thereon while bad odor from the reservoir is prevented from rising therethrough. After use, the flange is rotated so as to open the lower cylindrical membrane for discharging the faeces thereon into the reservoir while the upper cylindrical membrane is closed to prevent bad odor from rising into the lavatory room and prevent the faeces to be viewed by the user. After discharge of the faeces into the reservoir, the lower cylindrical membrane is closed by rotating the central flange to be ready for the next use. The throttle device has no disposable bag for collection and ready removal of waste material.

It is therefore one object of the invention to provide a portable toilet device which overcomes or substantially reduces disadvantages of prior art devices suitable for use in disaster areas or, as more normally, for use with caravans, campervans, mobile homes and on boats.

The present invention therefore in one preferred form provides a portable toilet device having, in-use, a disposable plastic material waste receiving bag therein, said device comprising an upper section and a lower section adapted to be movable with respect to each other from an open or in-use position to a closed or non-use position or vice versa wherein movement of the device from the in-use to the non-use position causes a temporary closure or sealing of the bag and wherein movement of the device from the non-use to the in-use position causes the bag to open ready for use.

Preferably the lower section includes an open canister or receptacle to support or position the suspended bag. Preferable the movement of the device from the open to the closed position causes a turnable, on which the canister or receptacle is disposed to rotate, providing twisting action to temporarily close or seal the bag.

Preferably the upper section includes a seat section and a lid suitably hinged to the device as is customary. Preferably the lid of the device contains a compartment for storage of toilet paper or tissues and also a dispenser for holding and dispensing a gelling agent, or a gelling agent and a disinfectant, or deodorant.

The present invention also provides a portable toilet device having, in-use, a disposable plastic material waste receiving bag therein, said device comprising an upper section and a lower section adapted to be movable with respect to each other from an open or in-use position to a closed or non-use position wherein movement of the device from the use to the non-use position causes a temporary closure or sealing of the bag. Preferably the upper and lower sections are substantially cylindrical in shape such that the movement between the sections is a spiral or telescopic movement, and the upper section includes a rim surmounted by a hinged toilet seat and cover and in which said lower section includes a base, said bag being releasably disposed over said rim and held in place by said seat, said bag being suspended within said device and resting on the base of the lower section. Preferably the device additionally includes a canister or receptacle within the lower section disposed between the base and the bag to support and position the bag within the device and an additional waterproof material lining bag disposed outside said bag and fixed in like manner over the rim of the upper section and preferably attached by fixing means to said canister or receptacle.

Furthermore, it is preferred that the movement between the upper and the lower section is a spiral movement attained by appropriate grooves and runners on said sections, such that movement of the device from the in-use to the non-use position causes the top of the bag to rotate with the upper section and with respect to the lower section to impart a twist to the bag as the device is rotated and lowered from the in-use to the non-use position or that the movement between the upper and lower sections is a vertical telescopic movement and rotational movement is applied to said bag to twist the bag as the upper section of the device is lowered from the in-use to the non-use position, said twisting movement being applied by a turntable disposed between the canister and the base of the lower section and operated by mechanical means in response to telescopic movement of the upper section with respect to the lower section.

Alternatively, the invention provides a portable toilet device having a disposable plastics waste receiving bag therein, said device comprising an upper section having a rim surmounted by a hinged toilet seat and cover and a lower section including a canister or receptacle for supporting and positioning said bag, said bag being releasably fitted over said rim and under said seat of said device to releasably hold said bag in said device and to aid in imparting relative movement to said bag when said device is operated from an open or in-use position to a closed or non-use position, to temporarily close or seal said bag.

Preferably the device additionally includes dispensing means preferably disposed in or on, i.e., adjoining the lid of the super section, for dispensing, a gelling material and/or deodorants, disinfectants and/or toilet paper.

In order that the invention may be more readily understood, a preferred form of the invention will now be described with reference to the accompanying drawings in which.

Figure 1:
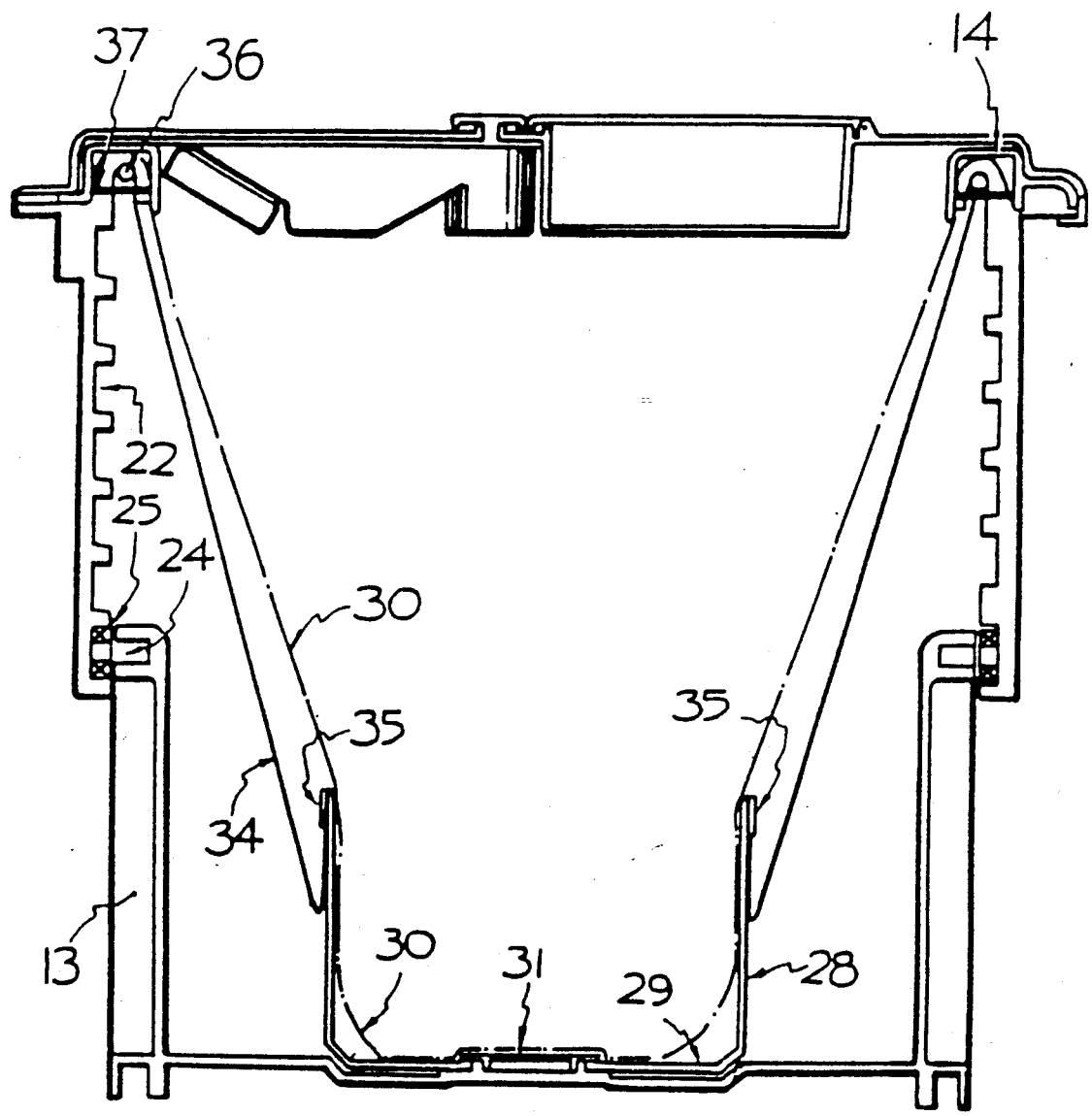
FIGS. 1 and 2 are cross-sectional views of a portable toilet device constructed in accordance with the invention shown in FIG. 1 in the use position and in FIG. 2 in the non-use position.

The portable toilet device (10), which is substantially circular in plan view, comprises a toilet body (11), comprising an upper section (12) and a base or lower secton (13). The upper section (12) includes seat (14) and lid (15) pivotally attached at hinge device (16). The base section (13) is cylindrical in plan view with open end and closed end (17). The upper section (12) is also substantially cylindrical in shape with bottom end (18) open and the top end (19) surmounted by a semicircular flange (20) defining recess or inverted circular channel (21). The minimum circumference of the flange defines an opening for the passage of bodily wastes when the device is in-use. The flange (20) also serves as a support for seat (14) and lid (15).

The construction of upper section (12) is such that it includes a spiral groove (22) integrally formed in the inner wall surface of side wall (13). The minimum internal diameter of the upper section being greater than the maximum external diameter of the base section (13). Mounted on the base section (13) by way of pins (24) is a plurality of ball or roller bearings (25) adapted to seat within the groove (22) of the upper section (12). It will be seen that by rotation of the upper section (12), the interaction of the groove (22) and bearings (25) will cause the upper section to rise or descend as the case may be to or from the use configuration from or to the closed or non-use configuration. The device is able to be locked in either the use or non-use position by means of a latch or lock device (26) appropriately biased as by spring means (27).

The construction of the device is such that the weight of the upper section (12) is sufficient to cause the device to rotate and lower from the open position to the closed position when the latch means is released.

Figure 2:
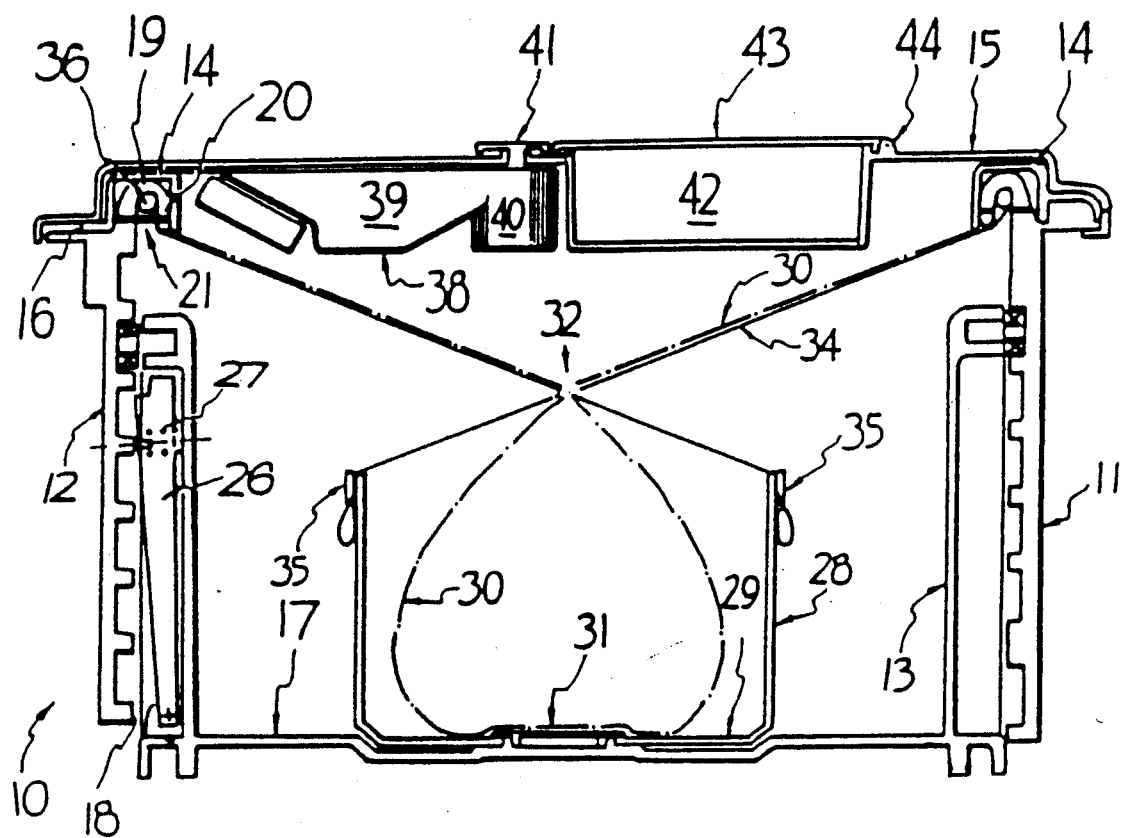

Placed within the device (10) and located in base (13) is a cylindrical canister (28) closed at its base (29). A plastics material bag (30) is disposed within the device such that its closed end (31) sits within the canister (28) and its open end (32) is disposed over flange (20) of the upper section (12) and held in place by weight of the seat (14). The bag is designed to receive the waste material when the device is in the use position and to retain the material when the device is not in-use. It will be seen that as the device moves from the use configuration to the non-use configuration that the motion of the upper section (12) with respect to the base (13) causes the bag to be twisted as shown at region 32 FIG. 2. Thus the device automatically, by twisting of the bag, causes a closing or temporary sealing of the bag to reduce likelihod of escape of offensive odours or waste matter. The bag may then be removed and sealed with a wire tie or other device until such time as the waste matter can be properly disposed of via a sewer. The sealed and tied bag may be stored within the device until such time as it can be disposed of or may be removed and stored in another suitable container. A new disposable bag may then be fitted ready for further use. The bag may be of any plastics material suitable including bio- or other degradable plastics materials.

In a particularly preferred form of the invention a fabric or cloth material conical tube (34) is provided which is attached at one end, by way e.g., of ring clip (35) to the canister (28). The other end is fitted by way of annular ring (36) within the channel (21) of the upper section (12) and retained therein by pins (37) which pass through and engage with appropriate bores in the upper section (12). The fabric tube (34) which is preferably waterproof provides a safeguard against escape of waste matter should bag (30) be defective or rupture during use of the device. The twisting of the material tube (34) as the device is operated from the in-use to the non-use position also serves to additionally temporarily close the bag (30). In another preferred form of the invention, the lid (15) includes a chemical container and dispenser (38) attached to the underside of the lid. When the lid is raised, a measured predetermined dose or amount of a chemical composition in the container portion (39), passes to the dispenser portion (40) on closure of the lid (15) following use of the device, lever or dispenser handle (41) is operated to release the chemical into the bag (30). The chemical preferably contains a gelling agent such as is sold under the trade name TERASORB and may also include other chemical agents such as disinfectants, perfumes or deodorants. The purpose of the addition of a gelling agent is to cause any liquid waste in the bag to form a gel which is more suitable for storage and transport in bag such as bag (30) than is a liquid.

Figure 3:
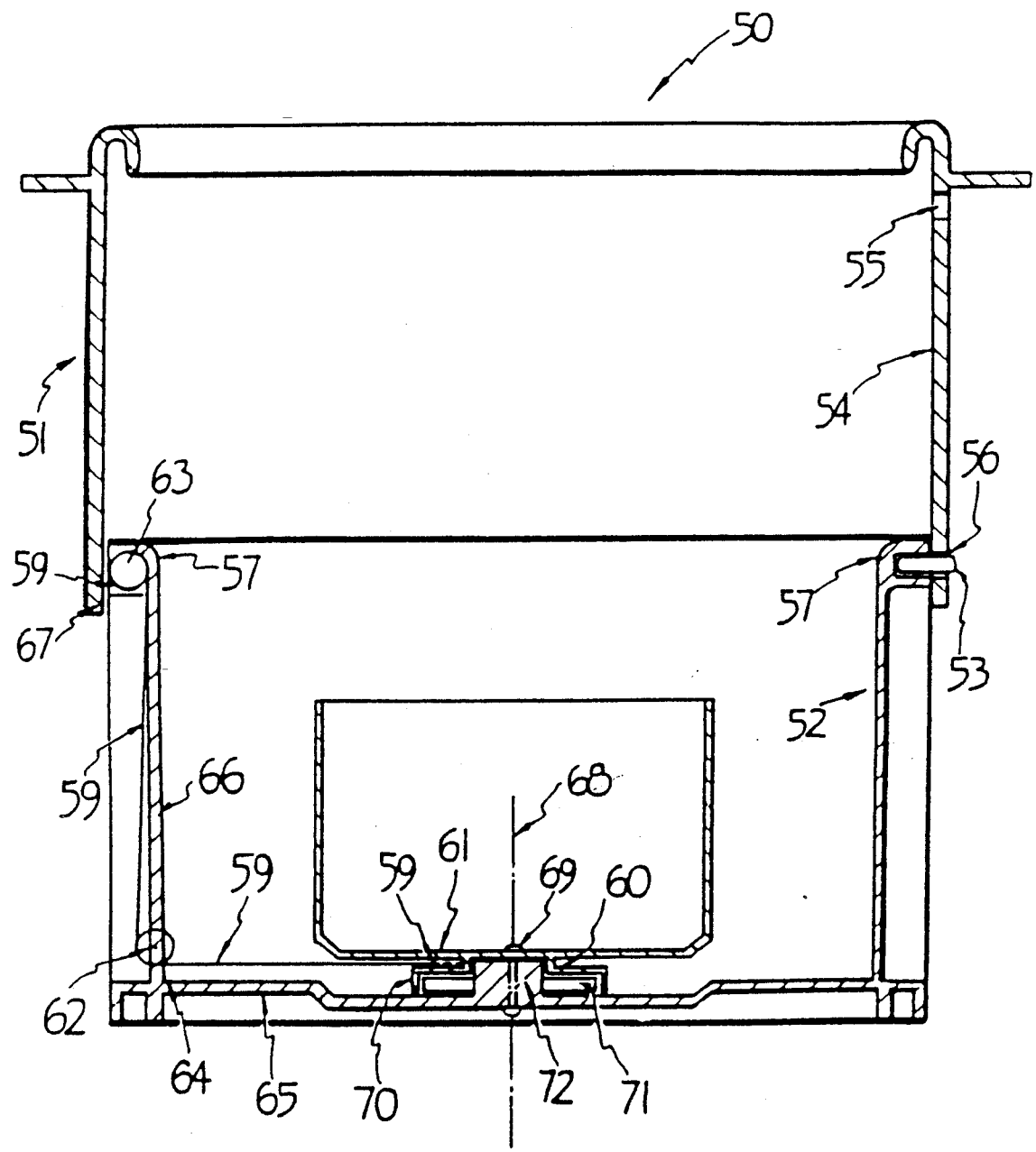
FIG. 3 shows an alternative construction of a portable toilet device in accordance with the invention.

Referring now to FIG. 3 there is shown a further embodiment of portable toilet device (50) in similar side elevation to that of FIG. 1 showing the device in the use or raised position but omitting the lid and bag detail for convenience. The device (50) includes as previously an upper section (51) and a base or lower section (52). The upper section (51) includes as previously appropriate lid and bag holding means not shown in this FIGURE. The upper section (51) which is substantially cylindrical in plan view is mounted on the lower section (52) by way of pin (53) co-operating with slot (54) which is of elongated C shape terminating in upper slot end (55) and lower slot end (56). The pin (53) is fixed at or near the upper rim (57) of the base (52). The elongated slot (54) permits the upper section (51) to be raised and lowered in a substantially vertical or linear manner with the slot ends 55 and 56 being designed to retrain the upper section either in locked, raised or lowered configuration.

As in this embodiment the upper section (51) does not rotate with respect to the lower section (52) when moving from the raised to the lowered configuration the canister (58) is caused to rotate by means of a cord (59) wound around and fixed at one end to pulley groove (60) formed below the bottom (61) of the canister (58). The cord passes over pulley (62) mounted at or near the function (64) of the base (65) and the wall (66) of the lower section and over pulley (63) mounted at or near the rim (57) of the lower section (52) and is fixed at its other end at or near the lower extremity (67) of the upper section (51). Thus as the upper section is lowered the movement of cord (59) causes the canister to rotate about axis (68) at which it is mounted via pivot means (69). Mounted at the edge of groove (60) is annular flange (70) which encloses, together with the base (65) of the lower section (52), a space in which coil spring (71) is mounted. The spring is attached to central base mounting (72) and to flange (70).

The spring is biased such that as the upper section is lowered energy is stored in the spring as the canister and flange rotates. As the upper section is raised the stored energy rotates the canister in the reverse direction. Thus as in the device of FIGS. 1 and 2, this device also permits the temporary closing of the bag (not shown) as the device is closed to enable the bag and contents to be hygienically removed for disposal or storage.

In the device illustrated there are four sets of pin and slot arrangements to guide movement of the upper and lower sections. Any movement number of such arrangements may however be utilised.

The particular gelling agent required may readily be determined by simple trial and error as may also be the quantity to be dispensed by the dispenser. It has been found, by way of example that 5 grams of TERASORB will gel 350 ml (about one and a half cuts) of waste liquid within 20 to 40 seconds under normal abient conditions. Thus a dispenser which dispenses from 4 to 6 grams of e.g. TERASORB should be adequate under normal circumstances. Under abnormal circumstances, however, several doses of the gelling chemical may be dispensed by operation of the lid and dispenser handle an appropriate number of times.

The lid (15) may also include compartment (42) for storage of packaged toilet paper or tissues. The tissues may be accessed by way of cover (43) hinged at (44) and retained in the closed position by means of the dispenser handle (41) or by separate latch means.

It has been found in a preferred form of the device as described, that the number of turns or rotations which the upper sections makes when travelling from the use to the non-use position is from about one half to three full turns with from three quarters to one and half turns being preferred. It has been found, where the second or fabric outer tube is used, that three quarters of a turn is adequate. It is also preferable that the canister be mounted in the base or lower section of the device on a turntable which is able to freely rotate through no more than one full turn, to ensure that, in the case of the upper section rotating two and one quarter turns from the in-use to the non-use position, that the bag is not twisted by too great an amount. The bag only needs to be twisted a small amount as the upper section is lowered, to provide the required temporary closure or sealing of the bag to contain the waste matter therein.

Figure 4:
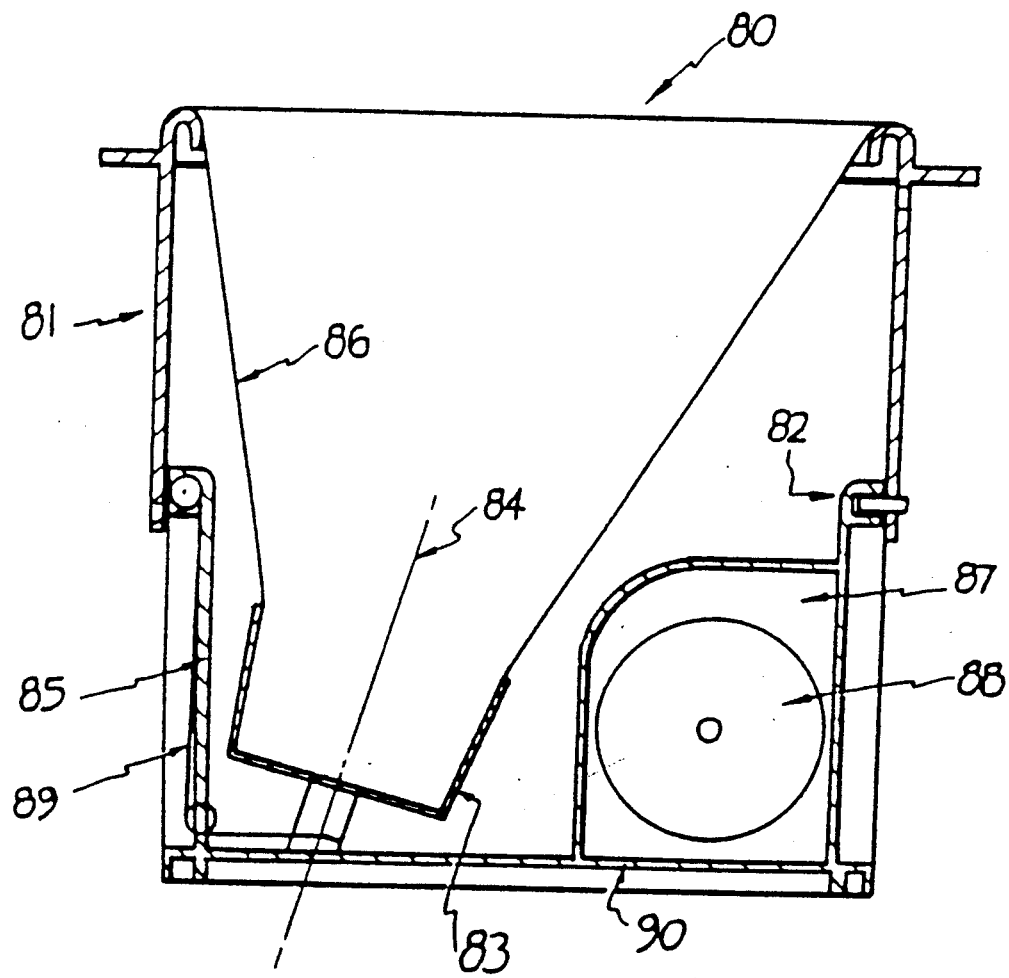
FIG. 4 shows schematically a particularly preferred construction of portable toilet device in accordance with the invention.

Referring to FIG. 4, there is shown in schematic cross section a particularly preferred form of construction of portable toilet device according to the invention.

The device, 80 is of similar basic construction to the device of FIG. 3 and includes an upper section 81 moveable vertically in relation to lower section 82. Canister 83 is mounted on suitable mounting means at an inclined axis 84 and displaced towards the "rear" wall 85 of the cylindrical lower section 82. Such disposition of the canister permits the disposable bag 86 to assume a more nearly vertical disposition towards the rear wall 85. This construction also permits inclusion of a compartment 87 in the "front" of the lower section for storage and dispensing of paper from toilet paper roll 88. In this preferred construction of the canister 83 is rotated about its axis 84 by means of three equally spaced wires in cords 89 disposed radially with respect to the plane of the base 90 of the lower section 82.

In this particular construction of portable toilet device it is possible to construct a suitable device having a diameter of about 300 mm maximum with a height of about 200 mm in the closed or non-use position and a height of about 360 mm in the open or in-use position. The lid (not shown) includes appropriate dispensing means for gelling agents and/or disinfectants and/or deodorisers as previously described.

The various sections of the device may be made of any suitable metal or plastics materials. Plastics materials such as ABS, polypropylene or high impact styrene are preferred. It will be realised of course that the bearings and hinge pins are preferably of any suitable metal. The parts may be manufactured by any suitable methods known in the plastics or metal working arts.

Whilst I have described herein preferred forms of the invention, it will be readily understood by those skilled in the art that many modifications may be made to the device without departure from the scope of the invention described herein. It will also be readily apparent to those skilled in the art that any gelling agent, other than TERASORB such as SALSORB may be used. The only requirement for the gelling agent is that any liquid materials in the bag are gelled within a reasonable time. The gelling agent of course, must not react with the bag itself.

I claim:

1. A portable toilet device having, in-use, a disposable plastic material waste receiving bag therein, said device comprising an upper section, and a lower section having a base, adapted to be movable with respect to each other in a linear manner from an open or in-use position to a closed or non-use position or vice versa said lower section including a canister or receptacle to support and position the bag within the device; and means comprising a turntable disposed between the canister and the base of the lower section and operated by means responsive to the linear movement of the upper section with respect to the lower section to apply a twisting movement to said lower section, whereby movement of the device from the in-use to the non-use position causes a temporary closure or sealing of the bag and whereby movement of the device from the non-use to the in-use position causes the bag to open ready for use.

2. A device as claimed in claim 1, wherein the upper section includes a rim surmounted by a hinged toilet seat and cover.

3. A device as claimed in claim 2, wherein the bag is releasably disposed over said rim and held in place by said seat.

4. A device as claimed in claim 3, wherein there is an additional water proof material lining tube disposed outside said bag and fixed at one end over the rim of the upper section and at the other end to the canister or receptacle and attached by fixing means to said canister or receptacle.

5. A device as claimed in claim 1, wherein the upper and lower sections are substantially cylindrical in shape.

6. A device as claimed in claim 1, and further comprising dispensing means adjoining the lid of the upper section for dispensing a gelling material and/or deodorants, disinfectants and/or toilet paper.

7. A portable toilet device comprising:
a lower section having a portion for supporting a bag;
an upper section mounted for movement with respect to said lower section;

a toilet seat on said upper section;

means on said upper section for releasably supporting a disposable waste receiving bag having a closed lower end and an open upper end with said upper end opened, so that said toilet seat opens into said opened upper end of a disposable waste receiving bag held by said supporting means;

means for closing a disposable waste receiving bag supported by said supporting means comprising:

a lining bag formed of waterproof material, having an open upper end and a lower end and being outwardly of a disposable waste receiving bag supported by said supporting means;

means for attaching the upper end of said lining bag in opened position to said upper section, said open upper end of said lining bag being beneath said toilet seat so that said toilet seat opens into said opened upper end of said lining bag;

means for attaching said lining bag at its lower end to said lower section; and means responsive to movement of said upper section in one direction for causing gathering of said lining bag intermediate its upper end and its lower end to thereby effect a closure of said lining bag and of a disposable waste receiving bag supported by said supporting means within said lining bag, and being responsive to movement of said upper section in the opposite direction for causing opening of the gathered portion of said lining bag and a said waste receiving bag therein.

8. A device as claimed in claim 7, wherein the upper section includes a rim surmounted by a hinged toilet seat and cover.

9. A device as claimed in claim 7, wherein the waste receiving bag and the lining bag are disposed over said rim and held in place by said seat.

10. A device as claimed in claim 7, wherein the upper and lower sections are cylindrical in shape and of differing diameters to ewnable relative axial movement therebetween to enable sdaid relative movement.

11. A device as claimed in claim 8, wherein the upper and lower sections are cylindrical in shape and of differing diameters to enable relative axial movement therebetween to enable movement from said non-use to said in-use position and vice versa.

12. A device as claimed in claim 7, said lower section having a base and further comprising a canister or receptacle within the lower section disposed between the base and the bag, to support and position the bag within the device.

13. A device as claimed in claim 7, and further comprising a disposable waste receiving bag having an open upper end and a closed lower end, said open upper end of said waste receiving bag engaged by said releasable supporting means with the upper end thereof in the opened position, said closed lower end of said disposable waste receiving bag supported by said portion of said lower section.

* * * * *